E. HARROLD & C. G. WILDERSON.
BAND SAW GUARD.
APPLICATION FILED APR. 17, 1911.

1,068,239.

Patented July 22, 1913.

2 SHEETS—SHEET 1.

WITNESSES
R. A. Balderson
Walter Famariss

INVENTORS
Elmer Harrold
C. G. Wilderson,
by Babewed Byrnes Parmelee,
their Attys.

E. HARROLD & C. G. WILDERSON.
BAND SAW GUARD.
APPLICATION FILED APR. 17, 1911.
1,068,239.
Patented July 22, 1913.
2 SHEETS—SHEET 2.
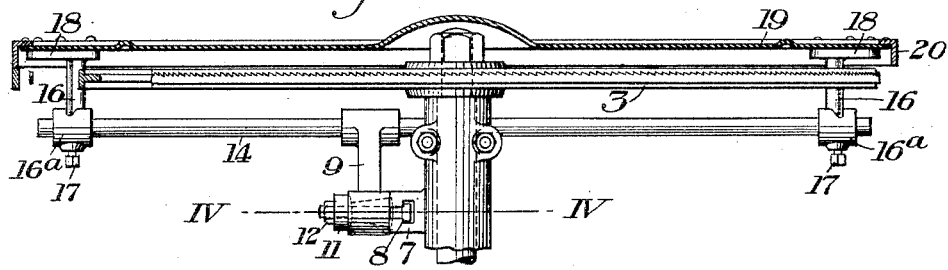
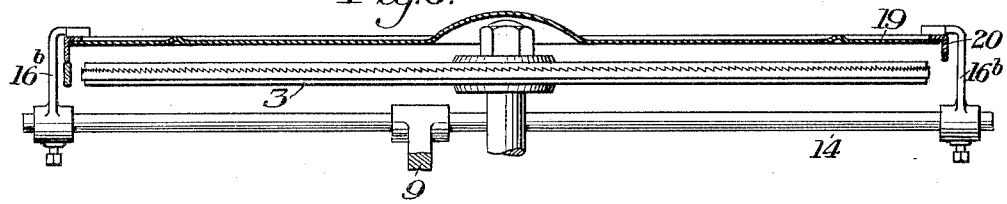
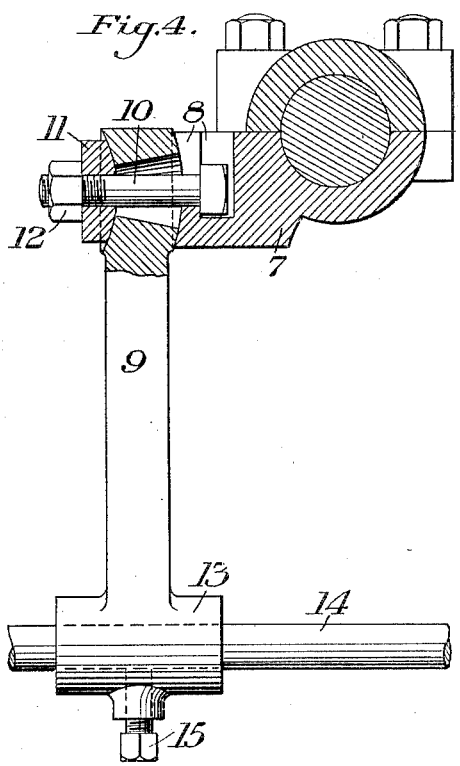
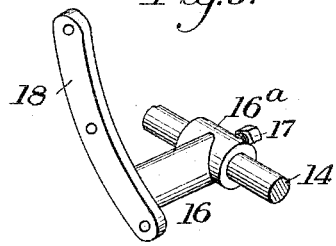
WITNESSES
R A Balderson
Walter Famariss
INVENTORS
Elmer Harrold
C. G. Wilderson
by Bakewell, Byrnes & Parmelee,
their Atty.
COLUMBIA PLANOGRAPH CO., WASHINGTON, D. C.

UNITED STATES PATENT OFFICE.

ELMER HARROLD AND CLINTON GEORGE WILDERSON, OF LEETONIA, OHIO, ASSIGNORS TO THE CRESCENT MACHINE COMPANY, OF LEETONIA, OHIO, A CORPORATION OF OHIO.

BAND-SAW GUARD.

1,068,239. Specification of Letters Patent. Patented July 22, 1913.

Application filed April 17, 1911. Serial No. 621,724.

*To all whom it may concern:*

Be it known that we, ELMER HARROLD and CLINTON GEORGE WILDERSON, of Leetonia, in the county of Columbiana and State of Ohio, have invented a new and useful Improvement in Band-Saw Guards, of which the following is a full, clear, and exact description, reference being had to the accompanying drawings, forming part of this specification, in which—

Figure 1:
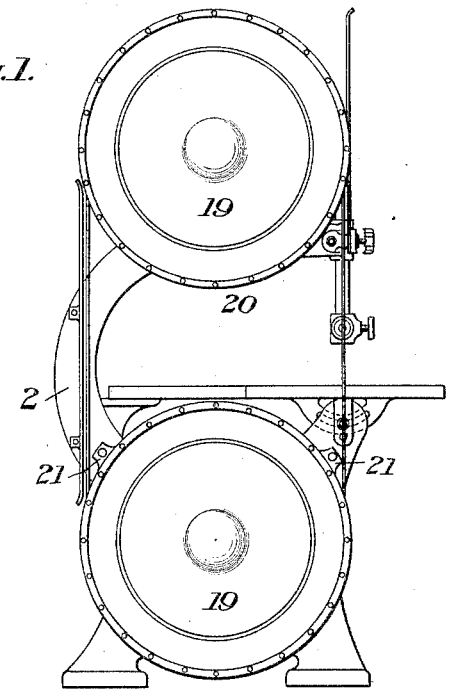
Figure 2:
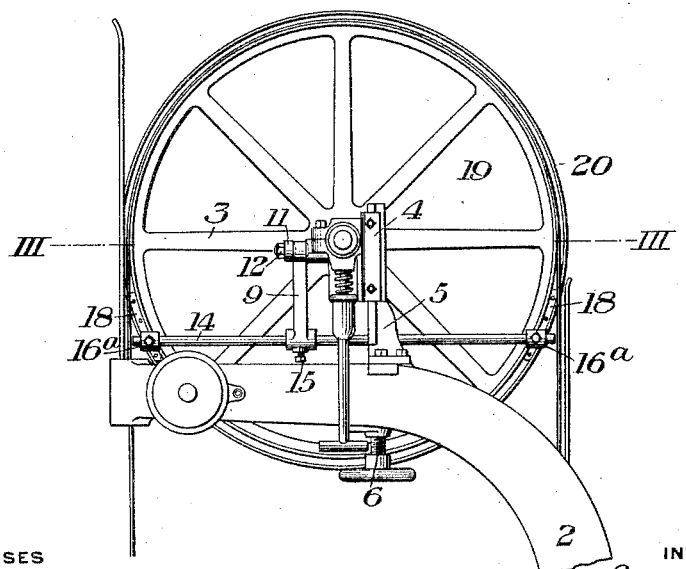

Figure 1 is a front view of a band saw with one form of our improved guard attached. Fig. 2 is a rear view of the upper portion of the saw. Fig. 3 is a partial section on the line III—III of Fig. 2. Fig. 4 is a sectional view on the line IV—IV of Fig. 3. Fig. 5 is a perspective view of one of the supporting arms for the guard for the upper wheel; and Fig. 6 is a view similar to Fig. 3, illustrating a modified form of supporting arms for the guard.

This invention relates to band saw guards and is designed to provide a cheap, simple and efficient device of this character to cover both the upper and lower band wheels, and so arranged that the band can be removed and replaced without disconnecting the guards.

Another object of our invention is to provide supports for the guard covering the upper band wheel which are arranged to suit the various requirements and which are so connected that the guard will be shifted when the band wheel is shifted to take up the slack in the saw band.

The precise nature of our invention will be best understood by reference to the accompanying drawings, which will now be described, it being premised, however, that various changes may be made in the details of construction and general arrangement of the parts without departing from the spirit and scope of our invention as defined in the appended claims.

In the accompanying drawings, the numeral 2 designates the frame of the machine, which is provided with suitable journals for the band wheels 3. The journal for the upper band wheel is arranged to slide in a guide 4 on an upward extension 5 from the frame 2.

6 is the adjusting screw for adjusting the band wheel 3 and taking up the slack of the saw band. The journal box for the upper band wheel 3 is provided with an extension 7 having a T-shaped slot 8. The outer face of this extension 8 is concave and is arranged to receive a convex face on one end of a bracket 9.

10 is a bolt passing through an opening in the end of the bracket 9, said opening being located centrally with relation to the convexed portion of said bracket. The end of this bolt is provided with a head which is seated in the T-slot 8, and 11 is a washer having a convexed face arranged to be seated in a concavity at the opposite face to the convexed portion on the end of the bracket, and 12 is a nut on the end of the bolt 10 arranged to clamp the members in their adjusted positions. The other end of this bracket 9 is provided with a boss 13 having an opening therethrough for the reception of a rod 14, and 15 is a set screw for securing the rod in the boss. Extending outwardly at each end of the rod 14 is an arm 16 provided with a boss 16$^a$ through which the rod 14 extends and also provided with set screws 17 for securing the arms to the rod. The outer ends of these arms 16 are provided with arcuate extensions 18.

19 is the band wheel guard which is preferably formed of a disk shaped member, and is connected to an annular member 20 of angular cross section. The guard is connected to the extensions 18 by means of rivets passing through openings in said extension, the disk and the one flange of the annular member 20. The guard for the lower band wheel is similar to that just described, but is secured to brackets 21 which are in turn connected to the frame of the machine.

In Fig. 6 we have illustrated a slightly modified form of arms 16$^b$ for connecting the guard for the upper band wheel to the supporting rod 14. When it is desired to remove a band from a machine having guards such as are illustrated in Figs. 1 to 5, the band is first removed from the wheels, and then successively moved forwardly over the guards. In the construction shown in Fig. 6, the band is first removed from the wheels so that the band is between the upper guard and the wheel; one portion of the band is then turned at right angles and passed between the guard and the nut on the end of the shaft of the wheel 3. The band is then removed from between the guard and the wheel, after which it can readily be slipped over the guard for the lower wheel.

By the use of a connection such as the ball and socket connection between the extension 8 and the bracket 9, we are enabled to obtain a universal adjustment of the bracket 9, and by means of the various adjusting connections between the rod 14, the bracket 9 and the guard supporting arms 16, the guard can be adjusted in proper relation with the upper band wheel. As all of the various connections for the upper band wheel are supported on the adjustable journal for said wheel, the guard and all of its various connections will be simultaneously shifted with said band wheel when it is adjusted to take up the slack in the band.

The advantages of our invention result from the provision of a band saw guard which is adapted to be secured in front of either of the band wheels and protect the operator from being caught by the wheel or saw passing around said wheels, and arranged to permit the band to be removed without disconnecting the guards. Another advantage results from the provision of connections for the guard for the upper band wheel which are supported on the adjustable journal, and which are adapted to be adjusted with relation to the wheel. By the use of a guard of this character, the operator is not only protected from being caught by the spokes of the wheels and the saw passing around the wheels, but he is also protected from being caught by the band, if said band should break and become entangled in the spokes of the wheels. The guard itself may be made of any suitable material and of any desired shape, and we do not limit ourselves to the form shown.

We claim:

1. A device of the character described, comprising a main frame, shafts journaled in said frame, saw band wheels connected to the front ends of said shafts, a continuous saw band mounted on said wheels, a guard member in front of one of said wheels, a supporting device connected to the guard member extending rearwardly beyond the wheel through the closed loop of the saw band, and means for connecting said supporting device to the frame; substantially as described.

2. A device of the character described, comprising a main frame, shafts journaled in said frame, saw band wheels connected to the front ends of said shafts, a continuous saw band mounted on said wheels, guard members in front of said wheels, supporting devices for the guard members connected to the frame, said supporting devices extending through the closed loop formed by the saw band and between the wheels, said supports and guards being arranged to permit the saw band to be placed in position on the wheels and removed therefrom without disturbing the guards; substantially as described.

In testimony whereof, we have hereunto set our hands.

ELMER HARROLD.
CLINTON GEORGE WILDERSON.

Witnesses:
JESSIE J. GALLAGHER,
JOHN B. MORGAN.